G. W. HOHN & E. G. REISINGER.
AIR BRAKE.
APPLICATION FILED SEPT. 28, 1911.
1,029,368.
Patented June 11, 1912.
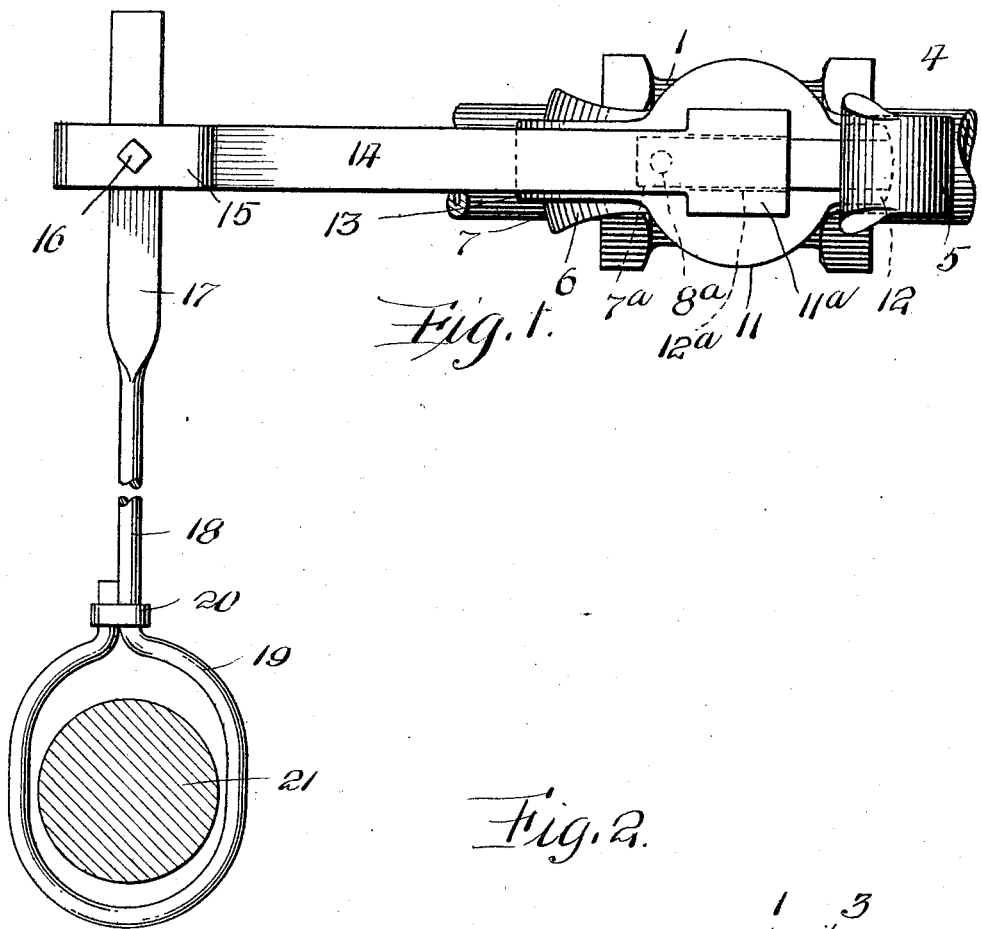
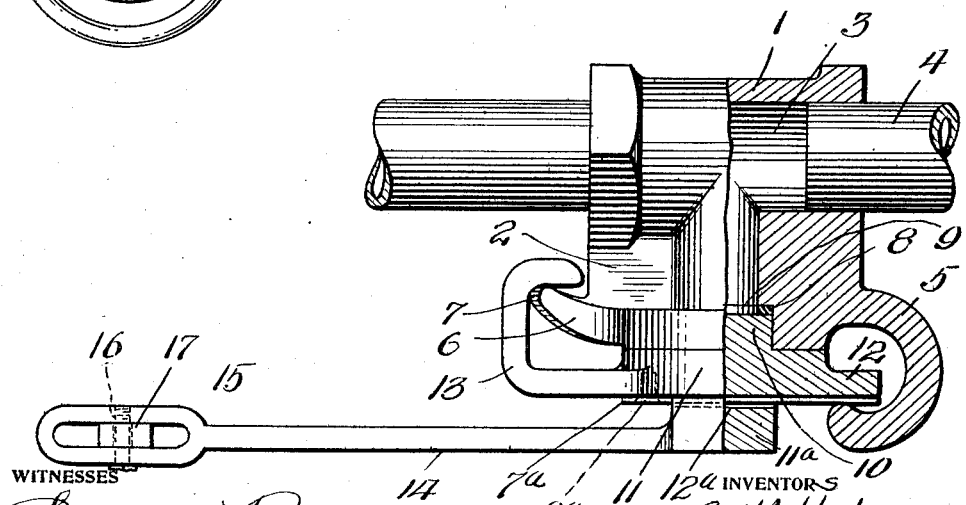
WITNESSES
Samuel Payne.
Ralph C. Evert.
INVENTORS
G. W. Hohn, and
E. G. Reisinger.
BY
ATTORNEYS

UNITED STATES PATENT OFFICE.

GEORGE W. HOHN AND EDWARD G. REISINGER, OF BUTLER, PENNSYLVANIA.

AIR-BRAKE.

1,029,368.  Specification of Letters Patent.  Patented June 11, 1912.

Application filed September 28, 1911. Serial No. 651,684.

*To all whom it may concern:*

Be it known that we, GEORGE W. HOHN and EDWARD G. REISINGER, citizens of the United States of America, residing at Butler, in the county of Butler and State of Pennsylvania, have invented certain new and useful Improvements in Air-Brakes, of which the following is a specification, reference being had therein to the accompanying drawing.

This invention relates to air brakes and more particularly to a device for automatically releasing the air controlled brakes of a train should an accident occur, as the derailment of a car, the displacement of various parts of a truck or other parts of a car.

Our invention aims to furnish a train line pipe with a plug valve that will be automatically opened by a derailed truck of a car, to set the brakes and prevent a train or car from proceeding when the derailment or displacement of a portion of a truck occurs.

Another object of this invention is to provide a valve consisting of comparatively few parts that are easily reset after having been released to set the brakes of a car or train.

A further object of our invention is to provide a brake releasing device that can be easily installed in connection with the present system of air brakes and used in connection with various types of rolling stock.

With the above and other objects in view, the invention resides in the novel construction, combination and arrangement of parts to be hereinafter specifically described and then claimed.

Reference will now be had to the drawing, wherein:—

Figure 1 is a side elevation of the brake releasing device, and Fig. 2 is a plan of the same, partly broken away and partly in section.

A device in accordance with this invention comprises a valve body 1 having a lateral extension 2 and said valve body has a T port 3 in communication with a train line pipe 4 that is tapped into the longitudinal portion of the port 3. The lateral extension 2 has one end thereof provided with a curved arm 5, and the opposite end thereof with a curved lug 6, the end of which is beveled, as at 7. The extension 2 has an annular seat 8 for a gasket 9 and engaging said gasket is a plug 10 carried by a detachable valve head 11. The head 11 has a protuberance $11^a$ provided with an opening $12^a$.

Extending through the opening $12^a$ is a flat spring $7^a$ that has one end thereof secured to the head 11, as at $8^a$, while the opposite end engages the arm 5 and is retained in engagement therewith by a lip 12 carried by the head 11. The head 11 has a hook 13 engaging the beveled edge 7 of the lug 6.

The protuberance $11^a$ has an arm 14 and the outer end of said arm terminates in a loop 15. Pivotally mounted in the loop 15 by a screw bolt 16 is the upper flat end 17 of a connecting rod 18. The lower end of said rod is bent to form a loop 19 and the bent end of said rod is held by a strap 20. The loop 19 extends around an axle 21 or any other part of the truck that is liable to be displaced.

The device can be projected from either side of the train line pipe 4, adjacent to a truck, and sufficient play allowed in the rod 18, whereby vibrations of the truck relatively to a car body will not actuate the device to release the air brakes. But should the truck of a car be derailed, a lowering movement of the axle 21 of the truck will immediately pull upon the rod 18 and move the arm 14 to rotate the valve head 11 sufficiently to move the lip 12 out of engagement with the arm 5 and the hook 13 out of engagement with the beveled lug 6. The pressure of air in the train line pipe will then unseat the valve head 11, and as is well known in connection with air brakes, the release of air from the train line pipe will immediately set the brakes and retard the motion of a train. The plug 10 is seated upon the gasket 9 and then rotated until the lip 12 engages the arm 5 and the hook 13 engages the lug 6. The beveled edge of the lug 6 facilitates the hook 13 in riding into engagement with said lug. The spring $7^a$ prevents the valve head 11 from becoming accidentally displaced due to any vibrations of the train line pipe 4.

It is apparent from the foregoing that we have devised simple and effective means for releasing the pressure of air within a train line pipe, should an accident occur, to set the brakes, and it is obvious that any flexible connection can be used between the axle or truck of a car and the valve head 11.

What we claim is:—

The combination with a train line pipe, of a valve carried thereby and in communication with said train line pipe, an arm supported by said valve, a lug carried by said valve, a detachable head normally closing said valve, a lip carried by said head and engaging the arm of said valve, a flat spring carried by said head and coöperating with said lip in retaining said head in engagement with said valve, a hook carried by said head and engaging the lug of said valve, and means adapted to be actuated by the derailment or displaced part of a truck for moving said lip and said hook out of engagement with said arm and said lug whereby said head can be unseated by the pressure of air within said train line pipe.

In testimony whereof we affix our signatures in the presence of two witnesses.

GEORGE W. HOHN.
EDWARD G. REISINGER.

Witnesses:
N. LOUIS BOGAR,
MAX H. SROLOVITZ.

Copies of this patent may be obtained for five cents each, by addressing the "Commissioner of Patents, Washington, D. C."